(12) United States Patent
Park

(10) Patent No.: US 9,716,258 B2
(45) Date of Patent: Jul. 25, 2017

(54) BATTERY PACK

(75) Inventor: Sanghun Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1336 days.

(21) Appl. No.: 13/221,818

(22) Filed: Aug. 30, 2011

(65) Prior Publication Data
US 2012/0276419 A1 Nov. 1, 2012

Related U.S. Application Data

(60) Provisional application No. 61/479,324, filed on Apr. 26, 2011.

(51) Int. Cl.
*H01M 2/10* (2006.01)
*H01M 2/20* (2006.01)
*H01M 2/30* (2006.01)

(52) U.S. Cl.
CPC ......... *H01M 2/1077* (2013.01); *H01M 2/206* (2013.01); *H01M 2/305* (2013.01)

(58) Field of Classification Search
CPC ..... H01M 2/1077; H01M 2/305; H01M 2/206
USPC .......................................................... 429/7
See application file for complete search history.

(56) References Cited

U.S. PATENT DOCUMENTS

2004/0137314 A1* 7/2004 Fukui .................. H01M 2/348
429/62
2005/0110458 A1 5/2005 Seman, Jr. et al.
2007/0141868 A1 6/2007 Park
2009/0154048 A1 6/2009 Jang et al.
2010/0116525 A1 5/2010 Oka et al.

FOREIGN PATENT DOCUMENTS

| | | |
|---|---|---|
| JP | 2004-095357 A | 3/2004 |
| JP | 2006-004773 A | 1/2006 |
| JP | 2007-508681 A | 4/2007 |
| JP | 2008-205125 A | 9/2008 |
| JP | 2010-219564 A | 9/2010 |
| KR | 10-2006-0034510 A | 4/2006 |
| KR | 10-0659826 B1 | 12/2006 |
| KR | 10-2009-0064961 | 6/2009 |

OTHER PUBLICATIONS

Korean Notice of Allowance dated Apr. 26, 2013 for Korean Patent Application No. KR 10-2011-0088955 which claims priority from U.S. Appl. No. 61/479,324, filed Apr. 26, 2011; and captioned U.S. Appl. No. 13/221,818.

* cited by examiner

*Primary Examiner* — Ula C Ruddock
*Assistant Examiner* — Frank Chernow
(74) *Attorney, Agent, or Firm* — Knobbe Martens Olson & Bear LLP

(57) ABSTRACT

A battery pack is disclosed. In one embodiment, the battery pack includes i) a plurality of battery cells, ii) a first flexible board configured to electrically connect the battery cells to each other and having a plurality of first terminals. The battery pack also includes iii) a second flexible board contacting the first flexible board and having a plurality of second terminals which are electrically connected to the first terminals, wherein each of the second terminals comprises a plurality of protrusions and iv) a circuit module electrically connected to the second flexible board.

19 Claims, 4 Drawing Sheets

BATTERY PACK

RELATED APPLICATION

This application claims priority to and the benefit of Provisional Patent Application No. 61/479,324 filed on Apr. 26, 2011 in the U.S Patent and Trademark Office, the entire contents of which are incorporated herein by reference.

BACKGROUND

Field

The described technology generally relates to a battery pack.

Description of the Related Technology

In general, secondary batteries are rechargeable, i.e., they can be used multiple times. Rechargeable secondary batteries have been widely used for portable electronic equipment such as cellular phones, notebook computers, camcorders, hybrid electric vehicles (HEV), electric vehicles (EV), electric scooters, and the like.

In order to realize a high power and high battery capacity, the secondary battery may be manufactured in a battery pack including a plurality of battery cells. The battery cells are generally electrically connected to each other via a connection member such as a wire or a nickel plate.

SUMMARY

One inventive aspect is a battery pack, which may increase an electrical, mechanical coupling force between a first flexible board and a second flexible board while preventing short-circuit between the first and second flexible boards.

Another aspect is a battery pack which includes a plurality of battery cells, a first flexible board electrically connecting the plurality of battery cells to each other and having first soldering terminals, a second flexible board disposed on the first flexible board and having second soldering terminals electrically connected to the first soldering terminals, and a circuit module electrically connected to the second flexible board, wherein the second soldering terminals have two or more protrusion parts.

Another aspect is a battery pack, comprising: a plurality of battery cells; a first flexible board configured to electrically connect the battery cells to each other and having a plurality of first terminals; a second flexible board contacting the first flexible board and having a plurality of second terminals which are electrically connected to the first terminals, wherein each of the second terminals comprises a plurality of protrusions; and a circuit module electrically connected to the second flexible board.

The above battery pack further comprises a first insulating layer partially covering each of the first terminals, wherein the protrusions comprise first and second sub-protrusions, and wherein the first sub-protrusion contacts a portion of the first terminals. The above battery pack further comprises an insulating material covering a substantial portion of the second flexible board, wherein the first sub-protrusion is not covered by the insulating material, and wherein at least part of the second sub-protrusion is not covered by the insulating material.

The above battery pack further comprises a second insulating layer contacting the first insulating layer, wherein the second sub-protrusion contacts the second insulating layer. In the above battery pack, a spacing groove is formed between i) the first sub-protrusion and ii) the second sub-protrusion and the second insulating layer.

In the above battery pack, the second insulating layer contacts bottom and side surfaces of the second sub-protrusion. In the above battery pack, each of the first and second insulating layers has a substantially planar shape. In the above battery pack, a recess is formed in the first sub-protrusion. In the above battery pack, the second sub-protrusion partially surrounds the first sub-protrusion.

The above battery pack further comprises a soldering material covering the first and second sub-protrusions. In the above battery pack, the soldering material covers part of the first terminals. In the above battery pack, the second sub-protrusion is farther than the first sub-protrusion from the first terminals. In the above battery pack, a substantial portion of the second sub-protrusion does not vertically overlap with and does not contact the first terminals.

In the above battery pack, at least one of the protrusions extends in a direction substantially perpendicular to the circuit module. In the above battery pack, the at least one protrusion comprises two or three sub-protrusions. In the above battery pack, part of at least one of the protrusions extends in a direction substantially parallel with the circuit module. In the above battery pack, the circuit module comprises a plurality of connection pads, wherein the second flexible board comprises a plurality of third terminals connected to the connection pads, respectively, wherein each of the battery cells comprises a plurality of electrode tabs electrically connected to the first flexible board, and wherein the electrode tabs extend in a direction substantially perpendicular to the connection pads. In the above battery pack, each of the third terminals has a substantially rectangular shape with a groove formed therein.

Another aspect is a battery pack, comprising: a plurality of battery cells; a first flexible board configured to electrically connect the battery cells to each other and comprising a plurality of first terminals; a second flexible board contacting the first flexible board and having a plurality of second terminals which are electrically connected to the first terminals, wherein the second flexible board has a length and a width which is less than the length, and wherein at least one of the second terminals comprises at least one protrusion extending in the length direction; and a circuit module electrically connected to the second flexible board.

In the above battery pack, the at least one protrusion comprises a first protrusion which is formed on the first terminal and a second protrusion which is not formed on the first terminal. In the above battery pack, the second flexible board has a bent portion configured to provide a secured connection between the circuit module and the first flexible board, each being on a different respective plane.

Another aspect is a battery pack, comprising: a first plurality of battery cells; a second plurality of battery cells; a first flexible board configured to electrically connect the battery cells to each other, wherein the first flexible board has first and second sides opposing each other, wherein the first plurality of battery cells are connected to the first side, wherein the second plurality of battery cells are connected to the second side, and wherein the first flexible board comprises a plurality of first terminals; a second flexible board contacting the first flexible board and having a plurality of second terminals which are electrically connected to the first terminals, wherein each of the second terminals comprises a plurality of protrusions; a conductive material covering the protrusions; and a circuit module electrically connected to the second flexible board.

DETAILED DESCRIPTION

Embodiments will now be described more fully hereinafter with reference to the accompanying drawings.

Figure 1:
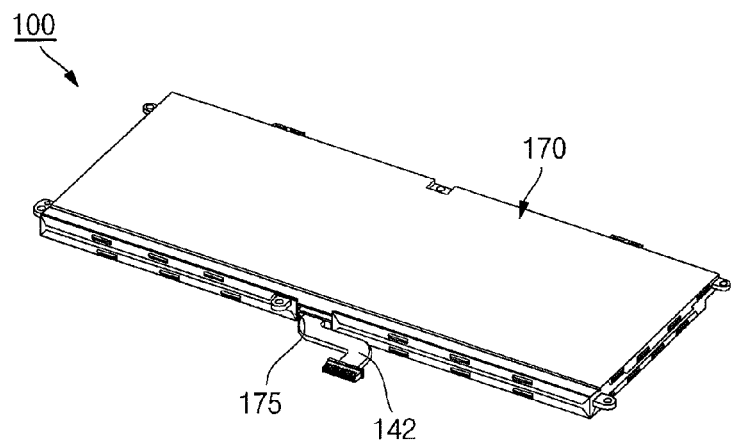
FIG. 1 is a perspective view illustrating an assembled state of a battery pack according to an embodiment.
Figure 2:
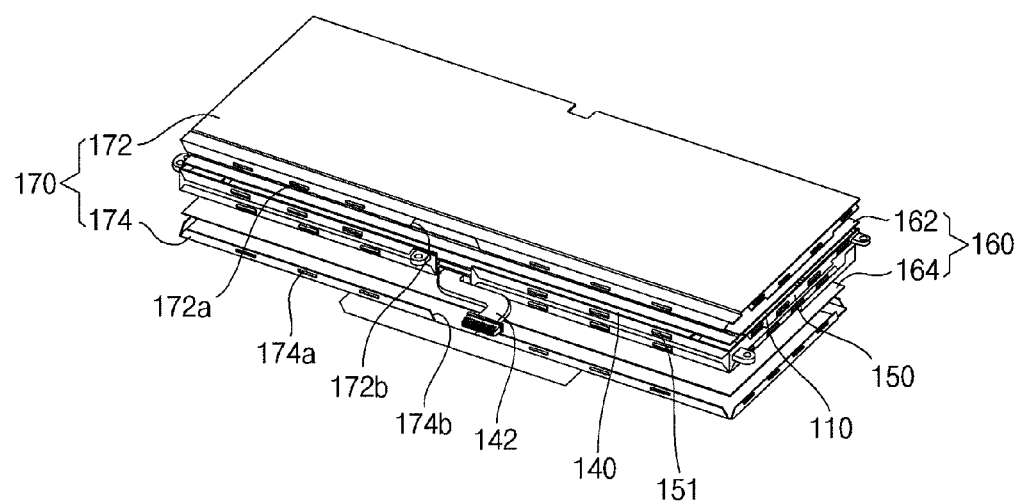
FIG. 2 is an exploded perspective view of the battery pack shown in FIG. 1.

Referring to FIGS. 1 to 5, the battery pack 100 includes battery cells 110 (see FIGS. 2 and 3), a first flexible board 120 (see FIGS. 3 and 4), a second flexible board 130 (see FIGS. 3 and 4), a circuit module 140 (see FIGS. 3 and 4), a frame 150 (see FIG. 2), an insulation member 160 (see FIG. 2) and a cover plate 170 (see FIGS. 1 and 2). The battery pack 100 may also include a soldering part 180 (see FIG. 7).

The battery cells 110 perform a discharge operation for supplying power to an external load and a charge operation for receiving power from a charger, or the like. Each of the battery cells 110 may include an electrode assembly (not shown) including a positive electrode, a negative electrode and a separator interposed between the positive and negative electrodes. Each of the battery cells 110 also includes a sheath member 111 accommodating the electrode assembly with an electrolyte (not shown) and electrode tabs 112 and 113 electrically connected to the electrode assembly and extending from a side portion of the sheath member 111. The sheath member 111 may be a pouch case. Each of the battery cells 110 including the pouch case can be easily manufactured in a desirable shape to be easily mounted on an external electronic device such as an external load. Although the illustrated embodiment shows four battery cells 110, the number of battery cells 110 can be adjusted according to the desired power.

Figure 3:
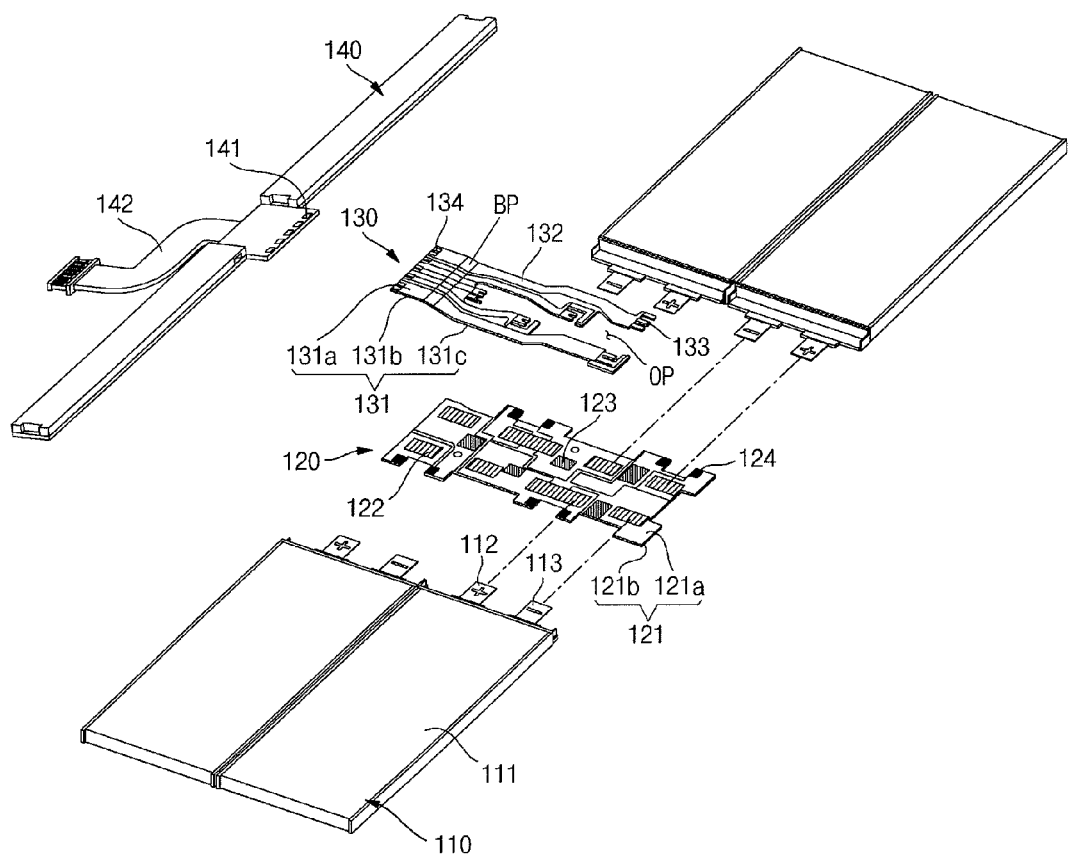
FIG. 3 is an exploded perspective view illustrating battery cells, a first flexible board, a second flexible board and a circuit module in the battery pack shown in FIG. 1.
Figure 4:
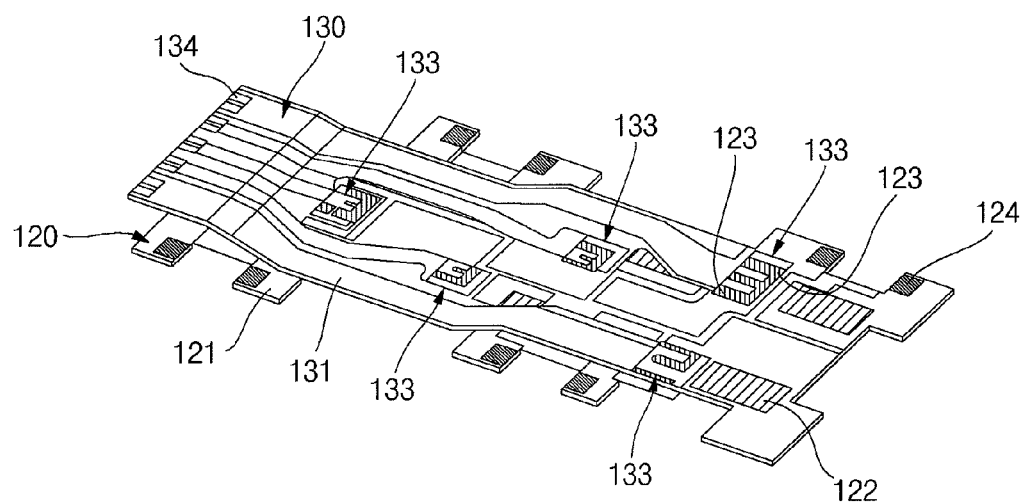
FIG. 4 is a perspective view illustrating an assembled state of the first flexible board and the second flexible board shown in FIG. 3.

In one embodiment, as shown in FIG. 3, the first flexible board 120 is disposed on a region facing the electrode tabs 112 and 113 of each of the battery cells 110 and overlaps with the electrode tabs 112 and 113 of each of the battery cells 110 in a substantially perpendicular direction to each other. The first flexible board 120 electrically connects the battery cells 110 to each other. The first flexible board 120 includes a first insulation layer 121, a plurality of first welding terminals 122, a plurality of first soldering terminals 123, and a plurality of positive temperature coefficient (PTC) terminals 124.

In one embodiment, the first insulation layer 121 has a substantially planar shape, and includes a first surface 121a and a second surface 121b opposite to the first surface 121a, forming an outer appearance of the first flexible board 120. In one embodiment, the first insulation layer 121 is made of a flexible and insulating material, for example, polyimide. The first insulation layer 121 may include cell connecting traces (e.g., wires or metal lines) (not shown) formed therein for electrically connecting the battery cells 110 to each other, and board connecting traces (not shown) for electrically connecting the cell connecting traces to the second flexible board 130. The cell connecting traces and the board connecting traces may be made of a conductive material, for example, nickel.

In one embodiment, the first welding terminals 122 are formed such that ends of the cell connecting traces are exposed from the first insulation layer 121, for example, via the first surface 121a and the second surface 121b, and are electrically and mechanically connected to the electrode tabs 112 and 113 of each of the battery cells 110 by a welding method, or the like.

In one embodiment, the first soldering terminals 123 are formed such that ends of the board connecting traces are exposed from the first insulation layer 121, for example, via the first surface 121a, and are electrically and mechanically connected to the second soldering terminals 133 of the second flexible board 130 by a soldering method, or the like. The soldering method may be typically employed when the first soldering terminals 123 and the second soldering terminals 133 are made of different materials. The first terminal 123 may be connected to the electrode tabs 112 and 113 via other welding mechanism such as laser welding, resistance welding or ultrasonic welding, or other bonding (welding or non-welding) mechanism. This applies to the connection between the second terminal 133 and the first terminal 123 and the connection between the third terminal 134 and the conductive pad 141. For convenience of the description, the disclosed embodiments will be described based on soldering mechanism.

The PTC terminals 124 are electrically connected to the cell connecting traces and the board connecting traces, and are exposed from the first insulation layer 121, for example, via the first surface 121a. In one embodiment, the PTC terminals 124 are electrically and mechanically connected to a PTC element (not shown) by a soldering method, or the like. When the battery cells 110 are at a high-temperature state due to, for example, overcharge, the PTC element detects the high-temperature state of the battery cells 110 and breaks a battery circuit.

Figure 5:
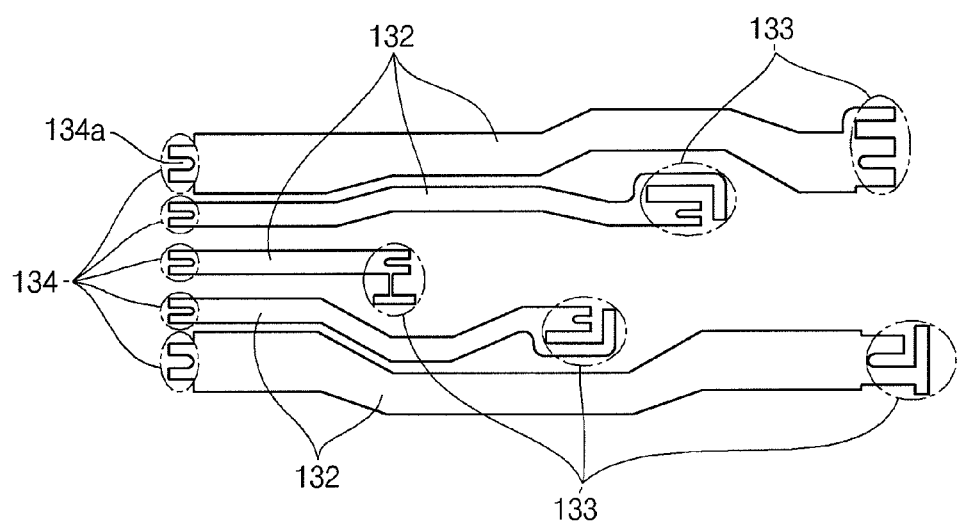
FIG. 5 is a plan view illustrating a plurality of connection traces, a second soldering terminal and a third soldering terminal of the second flexible board shown in FIG. 3.

The second flexible board 130 is disposed on the first flexible board 120 and electrically connects the first flexible board 120 to the circuit module 140. The second flexible board 130 includes i) a second insulation layer 131, ii) a plurality of connection traces 132, iii) a plurality of second soldering terminals 133 and iv) a plurality of third soldering terminals 134. In one embodiment, as shown in FIG. 2, the second flexible board 130 has i) a length defined in a direction substantially perpendicular to the circuit module 140, and ii) a width which is less than the length and defined in a direction substantially parallel with the circuit module 140. In one embodiment, as shown in FIG. 5, at least one of the second soldering terminals 133 includes at least one protrusion extending in the length direction. Furthermore, some of the second soldering terminals 133 may include a protrusion extending in the width direction (see FIG. 5). In one embodiment, the second insulation layer 131 has a substantially planar shape, and includes a first surface 131a, a second surface 131b opposite to the first surface 131a and a third surface 131c connecting the first surface 131a and the second surface 131b to each other, forming an outer appearance of the second flexible board 130 (See FIGS. 3 and 6). In addition, the second insulation layer 131 includes opening portions (OP) formed between each of the second soldering terminals 133. In addition, the second insulation layer 131 may include a bent portion BP (see FIG. 3) formed at a region adjacent to the circuit module 140. In one embodiment, the bent portion BP forms a level difference, and allows the circuit module 140 and the first flexible board 120 to be connected to each other in a secured manner when there is a height difference between the circuit module 140 and the first flexible board 120. The second insulation layer 131 may be made of a flexible and insulating material, for example, polyimide.

The connection traces 132 are patterns for electrically connecting the first flexible board 120 and the circuit module 140 to each other, and are formed in the second insulation layer 131. The connection traces 132 may include traces for extracting power of the battery cells 110, and traces for detecting voltages of the battery cells 110. The connection traces 132 may be made of a conductive material, for example, copper.

The second soldering terminals 133 extend substantially horizontally from ends of the connection traces 132 and are exposed from the second insulation layer 131, for example, via the third surface 131c. The second soldering terminals 133 are disposed to correspond to the first soldering terminals 123 of the first flexible board 120. The second soldering terminals 133 may be electrically and mechanically connected to the first soldering terminals 123 of the first flexible board 120 via, for example, a soldering method, or the like. In one embodiment, the second soldering terminals 133 are integrally formed with the connection traces 132 and are made of the same material as the connection traces 132.

The third soldering terminals 134 extend substantially horizontally from the other ends of the connection traces 132 and are exposed from the second insulation layer 131, for example, via the third surface 131c. The third soldering terminals 134 may be electrically and mechanically connected to a plurality of conductive pads 141 (See FIG. 3) of the circuit module 140 via, for example, a soldering method, or the like. In one embodiment, each of the third soldering terminals 134 has a substantially rectangular shape with a groove 134a. In one embodiment, the groove 134a provides for a space to be filled with lead (Pb) during soldering of the third soldering terminals 134 and the conductive pads 141, thereby increasing electrical and mechanical coupling forces between the third soldering terminals 134 and the conductive pads 141. In one embodiment, the circuit module 140 includes the conductive pads 141, and is electrically and mechanically connected to the second flexible board 130 when the third soldering terminals 134 contact the conductive pads 141. The circuit module 140 is electrically connected to the battery cells 110 through the second flexible board 130 and the first flexible board 120. Although not shown, the circuit module 140 may include a circuit configured to charge and discharge the battery cells 110, and a protective circuit configured to prevent the battery cells 110 from being over-charged or over-discharged, the charging and discharging circuit and the protective circuit formed on an insulating substrate. In addition, the circuit module 140 includes a connecting portion 142 to be electrically connected to an external electronic device, such as an external load, a charger, or the like. The insulating substrate forming the circuit module 140 may be a rigid board.

The frame 150 (see FIG. 2) is formed to receive the battery cells 110, the first flexible board 120, the second flexible board 130 and the circuit module 140. The frame 150 may include a coupling protrusion 151 formed at its exterior side and may be made of an insulating material.

The insulation member 160 includes a first insulating sheet 162 and a second insulating sheet 164 adhered to top and bottom surfaces of the battery cells 110. The insulation member 160 prevents short-circuiting between the battery cells 110 and the cover plate 170.

The cover plate 170 is formed to surround the battery cells 110, the first flexible board 120, the second flexible board 130, the circuit module 140, the frame 150 and the insulation member 160, thereby forming an outer appearance of the battery pack 100. In one embodiment, the cover plate 170 is made of a metal to reinforce the strength of the sheath member 111 to protect the battery cells 110 against external forces. The cover plate 170 includes a first cover plate 172 and a second cover plate 174 disposed at top and bottom portions of the battery cells 110. The first cover plate 172 has a first coupling hole 172a and the second cover plate 174 has a second coupling hole 174a. The first coupling hole 172a and a second coupling hole 174a are engaged with a coupling protrusion 151 to combine the frame 150 with the cover plate 170. In addition, the first cover plate 172 has a first connector exposing groove 172b and the second cover plate 174 has a second connector exposing groove 174b. The first and second connector exposing grooves 172b and 174b constitute a connector exposing hole 175 (see FIG. 1) of the cover plate 170, and the connecting portion 142 of the circuit module 140 is exposed from the cover plate 170 through the connector exposing hole 175.

The battery pack 100 may be electrically connected to an external load, a charger, or the like through the connecting portion 142 to perform a discharge operation for supplying power of the battery cells 110 to an external load and a charge operation for supply power from a charger, or the like to the battery cells 110 under the control of the circuit module 140.

Hereinafter, configurations of the second soldering terminals 133 and a connection relationship between the second flexible board 130 and the first flexible board 120 according to the configurations of the second soldering terminals 133 will be described in detail.

Figure 6:
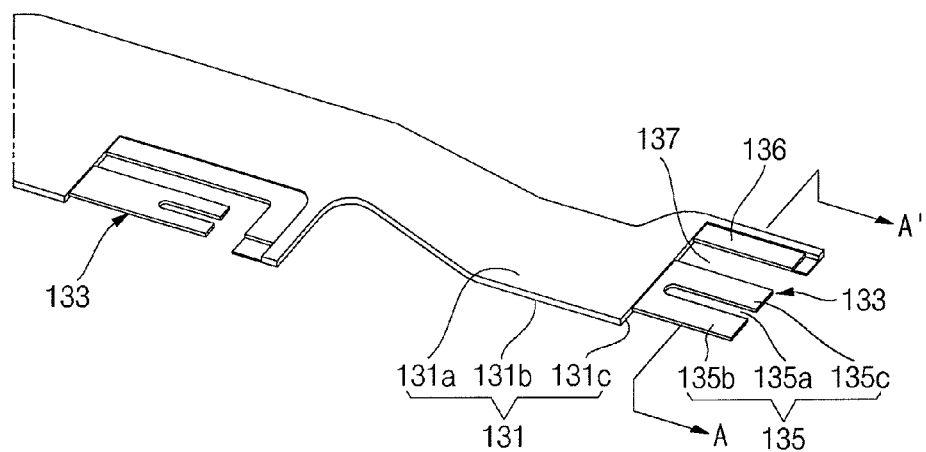
FIG. 6 is a plan view illustrating a portion of the second soldering terminal of the second flexible board shown in FIG. 3.
Figure 7:
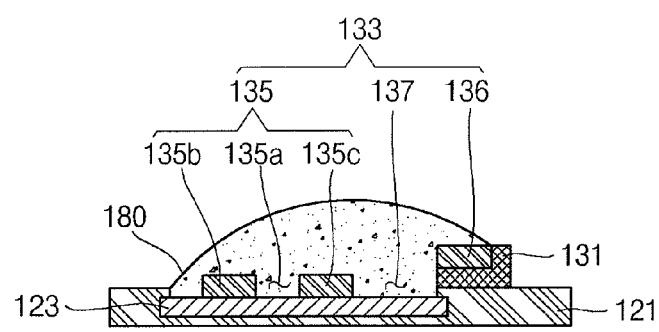
FIG. 7 is a cross-sectional view illustrating a structure in which a soldering part is formed at a contact portion between a first soldering terminal of a first flexible board and a second soldering terminal of a second flexible board shown in FIG. 6.

FIG. 6 is a plan view illustrating a portion of the second soldering terminal of the second flexible board shown in FIG. 3, and FIG. 7 is a cross-sectional view illustrating a structure in which a soldering part is formed at a contact portion between a first soldering terminal of a first flexible board and a second soldering terminal of a second flexible board shown in FIG. 6. FIG. 6 illustrates only two second soldering terminals by way of example and FIG. 7 illustrates a second soldering terminal portion, taken along line A-A' of FIG. 6. Referring to FIG. 6, each of the second soldering terminals 133 of the second flexible board 130 includes two or more protrusion parts 135 and 136 and a spacing groove 137. Here, the protrusion parts 135 and 136 are defined as a first protrusion part 135 and a second protrusion part 136. The first protrusion part 135 extends from a third surface 131c of the second insulation layer 131. The top and bottom surfaces of the first protrusion part 135 are both exposed from the second insulation layer 131. The first protrusion part 135 is disposed to substantially vertically overlap with the first soldering terminal 123 and contacts the first soldering terminal 123 of the first flexible board 120 to be electrically connected. The first protrusion part 135 includes a first part 135b and a second part 135c by a recess 135a. In one embodiment, the recess 135a widens a space to be filled with, for example, lead (Pb) during soldering of the first soldering terminal 123 of the first flexible board 120 and the second soldering terminal 133 of the second flexible board 130. While the first protrusion part 135 has two parts in the illustrated embodiment, it may have two or more parts.

In one embodiment, the second protrusion part 136 is adjacent to and spaced apart from the first protrusion part 135. The second protrusion part 136 is exposed from the third surface 131c of the second insulation layer 131, while a bottom surface and a side surface of the second protrusion part 136 are surrounded by the second insulation layer 131. In one embodiment, as shown in FIG. 7, the second protrusion part 136 is disposed at a location where it does not substantially vertically overlap with the first soldering terminals 123, and does not contact the first soldering terminal 123 of the first flexible board 120. In one embodiment, the second protrusion part 136 prevents short-circuiting between the first and second flexible boards 120 and 130 by preventing adjacent terminals of the first flexible board 120 from contacting each other under the second protrusion part 136 while allowing lead (Pb) to be applied onto a wide area above the second protrusion part 136 during soldering of the first and second soldering terminals 123 and 133. The second protrusion part 136 may have various shapes, including an 'I' shape, an 'L' shape, and so on.

In one embodiment, as shown in FIG. 7, during soldering of the first and second soldering terminals 123 and 133, lead (Pb) is coated on not only contact portions between the first soldering terminals 123 and the first protrusion part 135 but also a portion of the second protrusion part 136 having a bottom surface and a side surface thereof surrounded by the second insulation layer 131, thereby widening an area of a soldering part 180. The soldering part 180 having a wide area can relieve the stress generated due to external vibrations or impacts applied to contact portions between the first soldering terminals 123 of the first flexible board 120 and the second soldering terminals 133 of the second flexible board 130. Accordingly, the soldering part 180 can increase an electrical and mechanical coupling force between the first and second soldering terminals 123 and 133.

According to one embodiment, since the battery pack 100 includes i) the first soldering terminals 123 and ii) the second soldering terminals 133 each having two or more protrusion parts 135 and 136, the soldering part 180 having a wide area can be formed at contact portions between the first and second soldering terminals 123 and 133. Accordingly, the battery pack 100 can relieve the stress generated due to external vibrations or impacts applied to the contact portions between the first soldering terminals 123 of the first flexible board 120 and the second soldering terminals 133 of the second flexible board 130, thereby increasing the electrical and mechanical coupling force between the first and second flexible board 120 and 130.

In addition, short-circuiting between the first and second flexible board 120 and 130 can be prevented by the second protrusion part 136 having a bottom surface and a side surface thereof surrounded by the second insulation layer 131.

Furthermore, the battery cells 110 and the circuit module 140 are electrically connected using the first and second flexible board 120 and 130 having a relatively small thickness, thereby achieving slimness of the battery pack 100.

Moreover, a bent portion BP is formed in the second flexible board 130, thereby establishing a secured connection between the circuit module 140 and the first flexible board 120 when there is a height difference between the circuit module 140 and the first flexible board 120.

Embodiments have been disclosed with reference to the accompanying drawings, and they are not considered limiting. Accordingly, it will be understood by those of ordinary skill in the art that various changes in form and details may be made without departing from the spirit and scope of the following claims.

What is claimed is:

1. A battery pack, comprising:
   a plurality of battery cells;
   a first flexible board configured to electrically connect the battery cells to each other and
   having a plurality of first terminals, wherein the first flexible board includes at least one positive temperature coefficient (PTC) terminal;
   a second flexible board having a plurality of second terminals which are electrically
   connected to the first terminals, wherein each of the second terminals comprises a plurality of protrusions;
   a circuit module electrically connected to the second flexible board; and
   a first insulating layer partially covering each of the first terminals, wherein the protrusions comprise first and second sub-protrusions which are split and extended from an end of each protrusion, and wherein the first sub-protrusion contacts a portion of the first terminals.

2. The battery pack of claim 1, further comprising an insulating material covering a substantial portion of the second flexible board, wherein the first sub-protrusion is not covered by the insulating material, and wherein at least part of the second sub-protrusion is not covered by the insulating material.

3. The battery pack of claim 1, further comprising a second insulating layer contacting the first insulating layer, wherein the second sub-protrusion contacts the second insulating layer.

4. The battery pack of claim 3, wherein a spacing groove is formed between i) the first sub-protrusion and ii) the second sub-protrusion and the second insulating layer.

5. The battery pack of claim 3, wherein the second insulating layer contacts bottom and side surfaces of the second sub-protrusion.

6. The battery pack of claim 3, wherein each of the first and second insulating layers has a substantially planar shape.

7. The battery pack of claim 1, wherein a recess is formed in the first sub-protrusion.

8. The battery pack of claim 1, wherein the second sub-protrusion partially surrounds the first sub-protrusion.

9. The battery pack of claim 1, further comprising a soldering material covering the first and second sub-protrusions.

10. The battery pack of claim 9, wherein the soldering material covers part of the first terminals.

11. The battery pack of claim 1, wherein the second sub-protrusion is farther than the first sub-protrusion from the first terminals.

12. The battery pack of claim 1, wherein a substantial portion of the second sub-protrusion does not vertically overlap with and does not contact the first terminals.

13. The battery pack of claim 1, wherein at least one of the protrusions extends in a direction substantially perpendicular to the circuit module.

14. The battery pack of claim 13, wherein the at least one protrusion comprises two or three sub-protrusions.

15. The battery pack of claim 1, wherein part of at least one of the protrusions extends in a direction substantially parallel with the circuit module.

16. The battery pack of claim 1, wherein the circuit module comprises a plurality of connection pads, wherein the second flexible board comprises a plurality of third terminals connected to the connection pads, respectively, wherein each of the battery cells comprises a plurality of electrode tabs electrically connected to the first flexible board, and wherein the electrode tabs extend in a direction substantially perpendicular to the connection pads.

17. The battery pack of claim 16, wherein each of the third terminals has a substantially rectangular shape with a groove formed therein.

18. A battery pack, comprising:
a plurality of battery cells;
a first flexible board configured to electrically connect the battery cells to each other and
comprising a plurality of first terminals, wherein the first flexible board includes at least one positive temperature coefficient (PTC) terminal;
a second flexible board having a plurality of second terminals which are electrically connected to the first terminals, wherein the second flexible board has a length and a width which is less than the length, and wherein at least one of the second terminals comprises at least one protrusion extending in the length direction; and
a circuit module electrically connected to the second flexible board,
wherein the at least one protrusion comprises a first protrusion which is formed on the first terminal and a second protrusion which is not formed on the first terminal, and wherein the first portion and the second protrusion are split and extended from an end of each protrusion.

19. The battery pack of claim 18, wherein the second flexible board has a bent portion configured to provide a secured connection between the circuit module and the first flexible board, each being on a different respective plane.

* * * * *